US012178242B2

(12) United States Patent
Cha et al.

(10) Patent No.: US 12,178,242 B2
(45) Date of Patent: Dec. 31, 2024

(54) SMOKING ARTICLE CASE WITH HAND CARE FUNCTION

(71) Applicant: KT&G CORPORATION, Daejeon (KR)

(72) Inventors: Kwang Ho Cha, Daejeon (KR); Han Jin Kim, Daejeon (KR); Chul Hee Lee, Daejeon (KR); Chang Keun Im, Daejeon (KR); Kyung Bin Jung, Daejeon (KR); Nae Oh Chung, Daejeon (KR)

(73) Assignee: KT&G CORPORATION, Daejeon (KR)

(*) Notice: Subject to any disclaimer, the term of this patent is extended or adjusted under 35 U.S.C. 154(b) by 199 days.

(21) Appl. No.: 17/917,196

(22) PCT Filed: Nov. 12, 2021

(86) PCT No.: PCT/KR2021/016501
§ 371 (c)(1),
(2) Date: Oct. 5, 2022

(87) PCT Pub. No.: WO2022/154231
PCT Pub. Date: Jul. 21, 2022

(65) Prior Publication Data
US 2023/0157354 A1 May 25, 2023

(30) Foreign Application Priority Data

Jan. 12, 2021 (KR) .................. 10-2021-0003797

(51) Int. Cl.
*A24F 15/12* (2006.01)
(52) U.S. Cl.
CPC .................... *A24F 15/12* (2013.01)

(58) Field of Classification Search
CPC ........ A24F 15/12; A24F 15/18; A24F 15/08; A24F 15/02; B65D 85/10
(Continued)

(56) References Cited

U.S. PATENT DOCUMENTS 6,237,760 B1 * 5/2001 Parker ............... B65D 75/5838
                                                    206/273
2011/0253584 A1 * 10/2011 Duan ..................... B32B 9/02
                                                    428/323
(Continued)

FOREIGN PATENT DOCUMENTS

KR      20-0263078 Y1    2/2002
KR      20-0341064 Y1    2/2004
(Continued)

OTHER PUBLICATIONS

Office Action issued Feb. 10, 2023 issued in Korean Application No. 10-2021-0003797.
(Continued)

*Primary Examiner* — Steven A. Reynolds
(74) *Attorney, Agent, or Firm* — Sughrue Mion, PLLC

(57) ABSTRACT

A smoking article case with a hand care function may be provided. The smoking article case according to some embodiments of the present disclosure includes a body portion in which an inner space for storing a smoking article is formed and a cover which is connected to the body portion, wherein a functional care zone may be formed on at least a portion of an outer surface of the body portion and an outer surface of the cover. Microcapsules containing a functional material are applied on the functional care zone, and as the microcapsules are crushed by a smoker's rubbing motion and the functional material is discharged from the crushed microcapsules, the hand care function may be provided to the smoker.

10 Claims, 7 Drawing Sheets

(58) Field of Classification Search
USPC .......................................................... 206/242
See application file for complete search history.

(56) References Cited

U.S. PATENT DOCUMENTS

| | | | | |
|---|---|---|---|---|
| 2014/0262898 | A1* | 9/2014 | Anderson | ............... B65B 31/00 |
| | | | | 206/459.1 |
| 2015/0259132 | A1* | 9/2015 | Bernardo | ........... B65D 85/1036 |
| | | | | 156/60 |

FOREIGN PATENT DOCUMENTS

| | | | |
|---|---|---|---|
| KR | 10-2006-0056473 | A | 5/2006 |
| KR | 10-2012-0131417 | A | 12/2012 |
| KR | 10-2013-0023931 | A | 3/2013 |
| KR | 10-1284250 | B1 | 7/2013 |
| RU | 2 570 499 | C2 | 12/2015 |
| WO | 98/02044 | A1 | 1/1998 |
| WO | 2007/075205 | A2 | 7/2007 |

OTHER PUBLICATIONS

Office Action issued Jan. 18, 2023 in Russian Application No. 2022122671/03.
International Search Report of PCT/KR2021/016501 dated Feb. 25, 2022 [PCT/ISA/210].

\* cited by examiner

[FIG. 1]
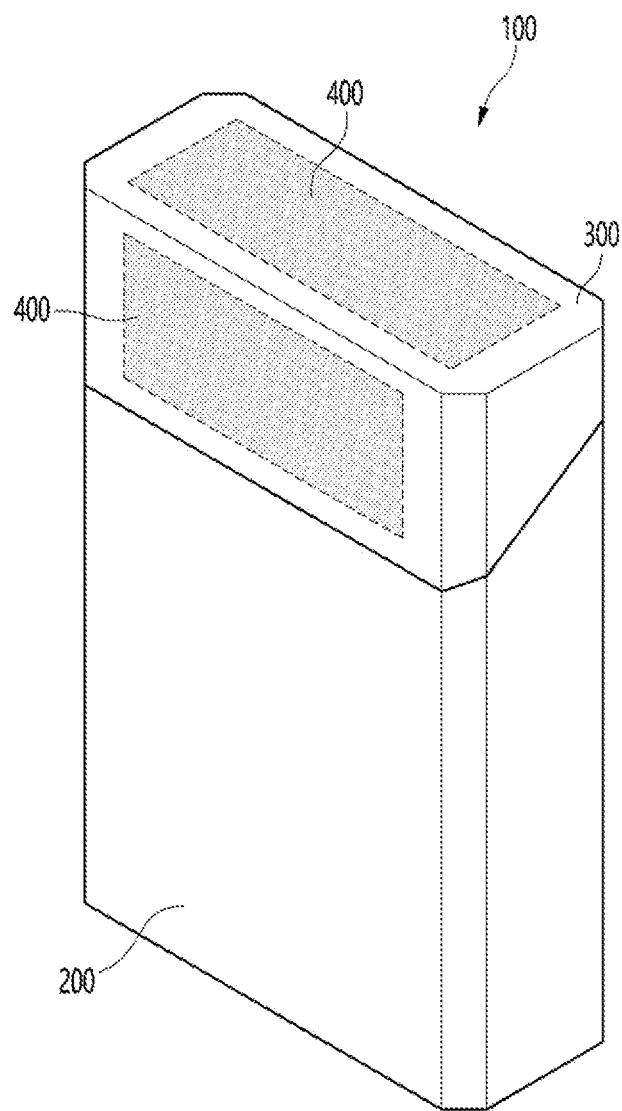

[FIG. 2]
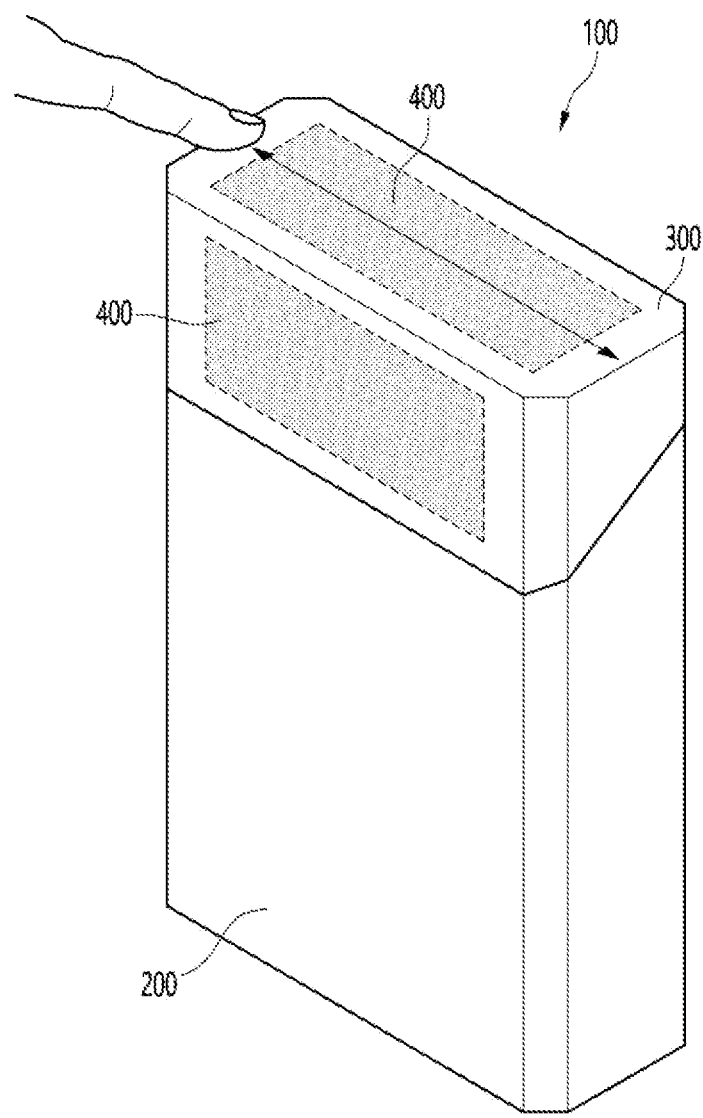

[FIG. 3]
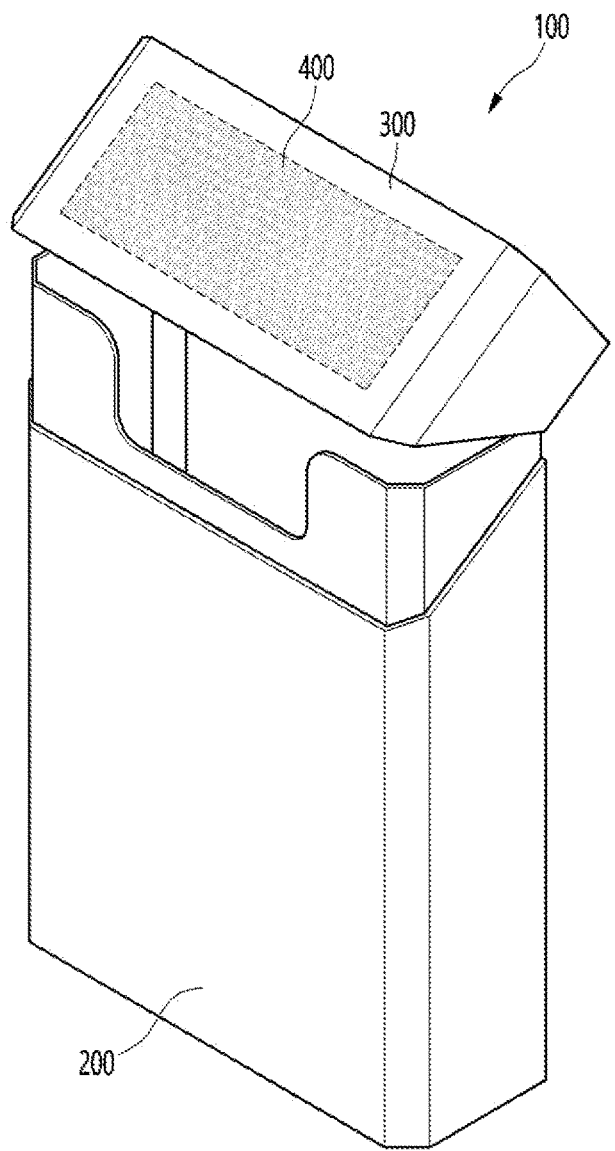
[FIG. 4]
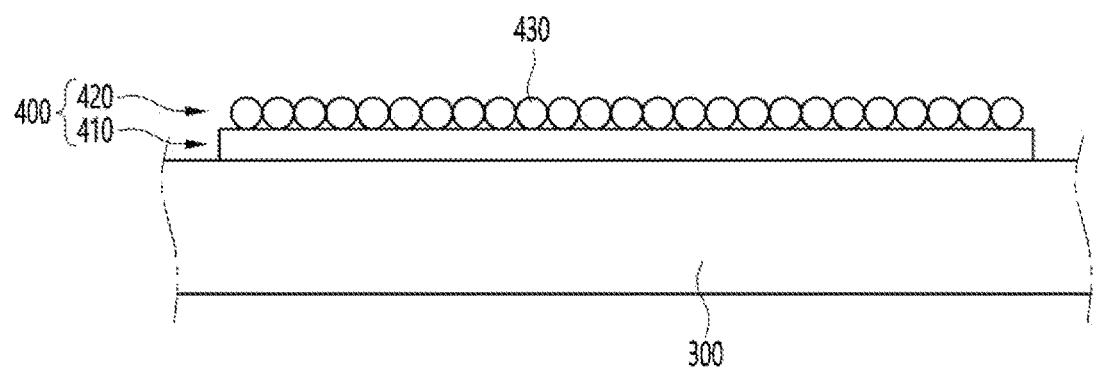

[FIG. 5]
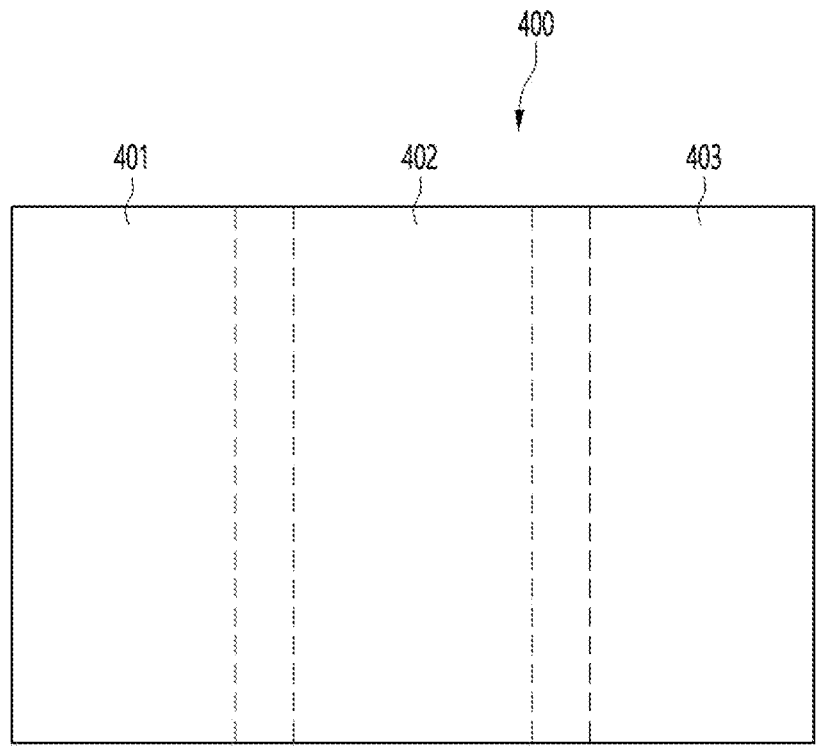
[FIG. 6]
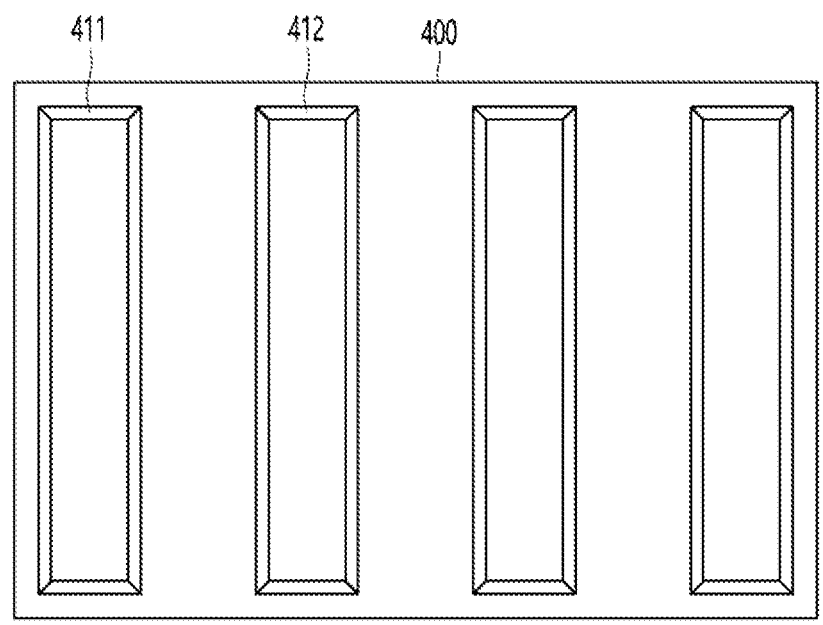

[FIG. 7]
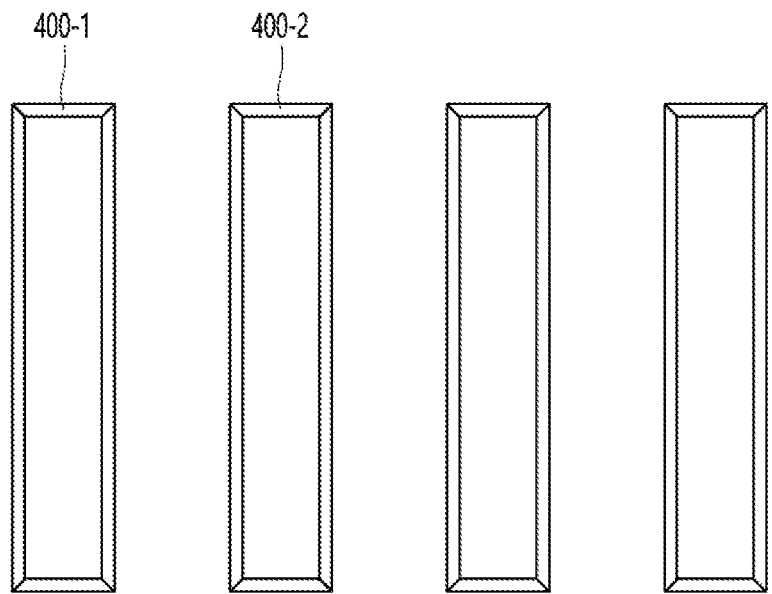
[FIG. 8]
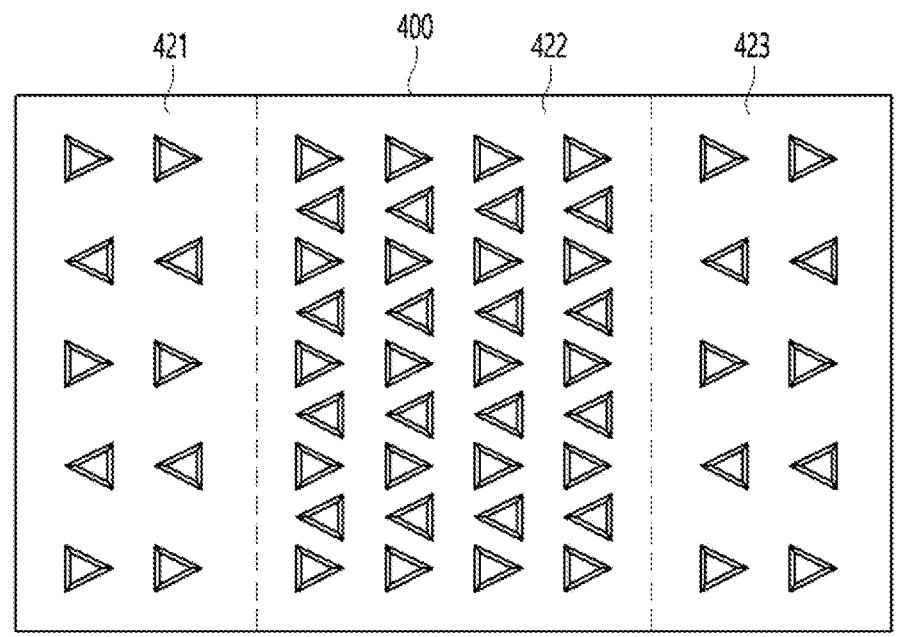

[FIG. 9]
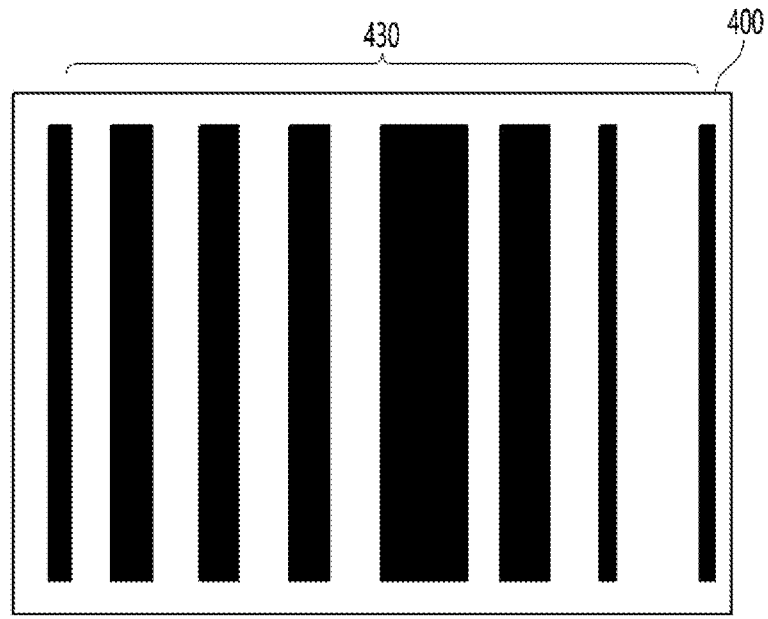
[FIG. 10]
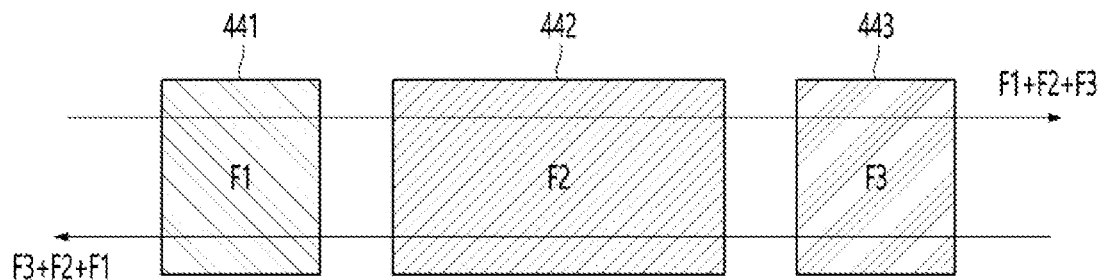
[FIG. 11]
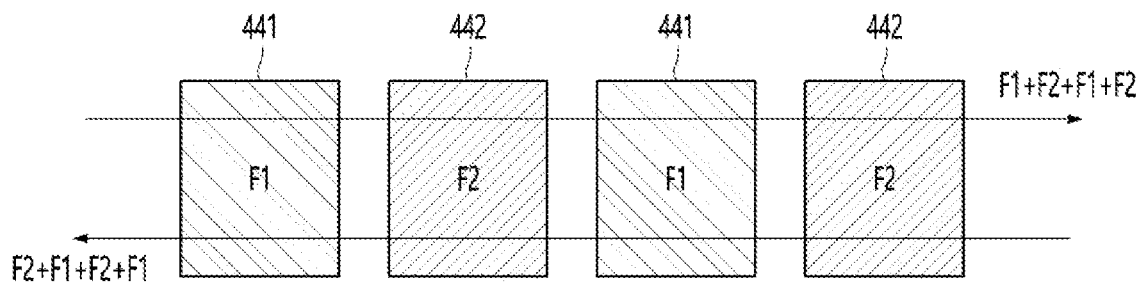

[FIG. 12]
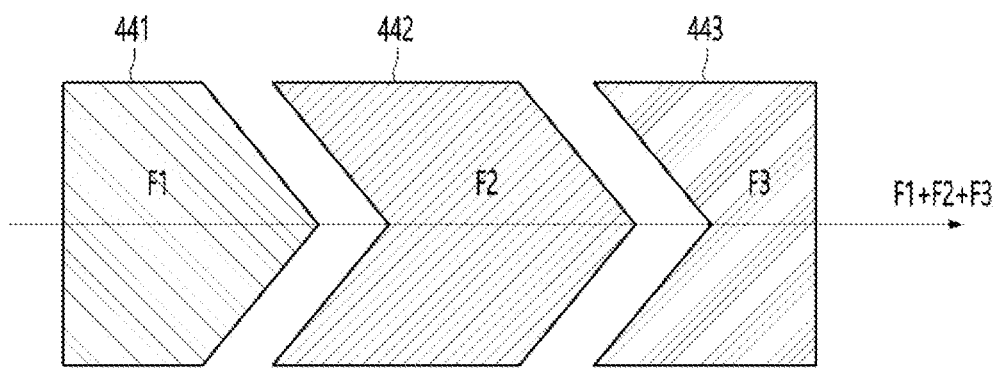

SMOKING ARTICLE CASE WITH HAND CARE FUNCTION

CROSS REFERENCE TO RELATED APPLICATIONS

This application is a National Stage of International Application No. PCT/KR2021/016501 filed on Nov. 12, 2021, claiming priority based on Korean Patent Application No. 10-2021-0003797 filed on Jan. 12, 2021.

TECHNICAL FIELD

The present disclosure relates to a smoking article case with a hand care function, and more particularly, to a smoking article case with a care function for hygiene or the like of a smoker's hand or finger area.

BACKGROUND ART

Generally, smoking articles are classified into cigarettes, cigars, etc. according to their shape, and among them, cigarettes account for the majority of consumption. A cigarette is a cylindrical article formed by finely grinding processed tobacco leaves and then rolling the finely ground tobacco leaves in cigarette paper, and articles in the form of cigarettes are generally stored and sold in cases made of paper.

Meanwhile, most smokers smoke a cigarette while holding the cigarette with their fingers, and thus an unpleasant smell lingers on a smoker's hand after smoking. Further, since the act of smoking increases contact between the fingers and the oral region, harmful bacteria present on the contaminated fingers or the cigarette may infiltrate the body through the oral region.

DISCLOSURE

Technical Problem

Some embodiments of the present disclosure are directed to providing a smoking article case with a hand care function.

Objectives of the present disclosure are not limited to the above-mentioned objective, and other unmentioned objectives should be clearly understood by those of ordinary skill in the art to which the present disclosure pertains from the description below.

Technical Solution

Some embodiments of the present disclosure provide a smoking article case including a body portion in which an inner space for storing a smoking article is formed and a cover which is connected to the body portion, wherein a functional care zone may be formed on at least a portion of an outer surface of the body portion and an outer surface the cover. Also, microcapsules containing a functional material may be applied on at least a portion of the functional care zone, and the functional material may include an antibacterial material.

In some embodiments, the antibacterial material may include one or more materials selected from the group consisting of grapefruit extract, lime oil, eucalyptus oil, pine needle oil, eucalyptol, limonene, and propolis.

In some embodiments, an ink may be applied on the at least a portion of the functional care zone, and the microcapsules applied on the functional care zone may further contain a material that changes a color or color density of the ink.

In some embodiments, first microcapsules having a first crushing strength may be applied on a first region of the functional care zone, second microcapsules having a second crushing strength may be applied on a second region of the functional care zone, and the first crushing strength may be lower than the second crushing strength.

In some embodiments, the functional care zone may include a plurality of protruding regions disposed apart from each other.

In some embodiments, an ink may be applied to indicate a designated symbol in the functional care zone, and information on the functional care zone may be coded in the designated symbol.

In some embodiments, the functional care zone may include a protrusion region in which a protrusion pattern is formed.

In some embodiments, the functional care zone may include a first functional care zone on which microcapsules containing a first functional material are applied and a second functional care zone on which microcapsules containing a second functional material different from the first functional material are applied, and inks of different colors may be applied on the first functional care zone and the second functional care zone.

In some embodiments, the functional care zone may further include a deodorizing zone and a perfuming zone in addition to an antibacterial zone on which the microcapsules containing the antibacterial material are applied.

Advantageous Effects

According to some embodiments of the present disclosure, microcapsules containing a functional material are applied on an outer surface of a smoking article case, and thus, a functional care zone may be formed. By discharging a functional material when rubbed against a smoker's hand or finger area (that is, the functional material is discharged as the applied microcapsules are crushed), the functional care zone may provide a hand care function to the smoker. For example, in a case in which an antibacterial material is used as the functional material, an antibacterial care function may be provided to the smoker's hand area.

Also, an ink may also be applied on the functional care zone, and information on characteristics (e.g., position, type, etc.) of the functional care zone may be visually conveyed to the smoker.

Also, the microcapsules applied on the functional care zone may further contain a material that changes a color or color density of the ink. In this case, as the microcapsules are crushed, the color or color density of the functional care zone gradually lightens or decreases, and thus information on the remaining period of use of the functional care zone may be visually conveyed to the smoker.

Also, microcapsules with a relatively higher crushing strength may be applied on an outer periphery region of the functional care zone, and microcapsules with a relatively lower crushing strength may be applied on a central region of the functional care zone. In this case, it is possible to mitigate a problem in which the microcapsules are crushed due to the smoker unintentionally rubbing against the functional care zone while carrying the smoking article case.

Also, in the functional care zone, a plurality of protruding regions disposed apart from each other may be formed or a protrusion pattern may be formed. In this case, since the microcapsules are easily crushed due to an increase in friction, the hand care function may be more easily provided.

In addition, microcapsules containing different functional materials may be applied on different regions to form a plurality of functional care zones. For example, a plurality of care zones such as an antibacterial zone, a deodorizing zone, and a perfuming zone may be formed. In this case, it is possible to provide multifaceted and comprehensive hand care functions to the smoker.

The advantageous effects according to the technical spirit of the present disclosure are not limited to those mentioned above, and other unmentioned advantageous effects should be clearly understood by those of ordinary skill in the art from the description below.

DESCRIPTION OF DRAWINGS

FIGS. 1 to 3 are exemplary views schematically illustrating a smoking article case according to some embodiments of the present disclosure.

FIG. 4 is an exemplary view for describing a structure of a functional care zone according to some embodiments of the present disclosure.

FIG. 5 is an exemplary view for describing a functional care zone according to a first embodiment of the present disclosure.

FIGS. 6 and 7 are exemplary views for describing a functional care zone according to a second embodiment of the present disclosure.

FIG. 8 is an exemplary view for describing a functional care zone according to a third embodiment of the present disclosure.

FIG. 9 is an exemplary view for describing a functional care zone according to a fourth embodiment of the present disclosure.

FIGS. 10 to 12 are exemplary views for describing a functional care zone according to a fifth embodiment of the present disclosure.

MODES OF THE INVENTION

Hereinafter, exemplary embodiments of the present disclosure will be described in detail with reference to the accompanying drawings. Advantages and features of the present disclosure and methods of achieving the same should become clear from embodiments described in detail below with reference to the accompanying drawings. However, the technical spirit of the present disclosure is not limited to the embodiments disclosed below and may be implemented in various different forms. The following embodiments are provided to make the technical spirit of the present disclosure complete and to fully inform those of ordinary skill in the art to which the present disclosure pertains of the scope of the disclosure. The technical spirit of the present disclosure is defined only by the scope of the claims.

In assigning reference numerals to components of each drawing, it should be noted that the same reference numerals are assigned to the same components where possible even when the components are illustrated in different drawings. Also, in describing the present disclosure, when detailed description of a known related configuration or function is deemed as having the possibility of obscuring the gist of the present disclosure, the detailed description thereof will be omitted.

Unless otherwise defined, all terms including technical or scientific terms used in the following embodiments have the same meaning as commonly understood by those of ordinary skill in the art to which the present disclosure pertains. Terms defined in commonly used dictionaries should not be construed in an idealized or overly formal sense unless expressly so defined herein. Terms used in the following embodiments are for describing the embodiments and are not intended to limit the present disclosure. In the following embodiments, a singular expression includes a plural expression unless the context clearly indicates otherwise.

Also, in describing components of the present disclosure, terms such as first, second, A, B, (a), and (b) may be used. Such terms are only used for distinguishing one component from another component, and the essence, order, sequence, or the like of the corresponding component is not limited by the terms. In a case in which a certain component is described as being "connected," "coupled," or "linked" to another component, it should be understood that, although the component may be directly connected or linked to the other component, still another component may also be "connected," "coupled," or "linked" between the two components.

The terms "comprises" and/or "comprising" used herein do not preclude the possibility of presence or addition of one or more components, steps, operations, and/or devices other than those mentioned.

Prior to the detailed description of various embodiments of the present disclosure, some terms used in the embodiments will be clarified.

In the following embodiments, "smoking article" may refer to any product that may be smoked or any product that may provide a smoking experience, regardless of whether the product is based on tobacco, tobacco derivatives, expanded tobacco, reconstituted tobacco, or tobacco substitutes. For example, smoking articles may include products that may be smoked, such as a cigarette, a cigar, and a cigarillo. As another example, smoking articles may include a combustion-type smoking article and a heating-type smoking article.

Hereinafter, various embodiments of the present disclosure will be described in detail with reference to the accompanying drawings.

FIGS. 1 to 3 are exemplary views schematically illustrating a smoking article case 100 according to some embodiments of the present disclosure.

As illustrated in FIGS. 1 to 3, the smoking article case 100 may include a body portion 200 and a cover 300. However, only the components relating to the embodiment of the present disclosure are illustrated in FIGS. 1 to 3. Therefore, those of ordinary skill in the art to which the present disclosure pertains should understand that the smoking article case 100 may further include general-purpose components other than the components illustrated in FIGS. 1 to 3. Hereinafter, each component of the smoking article case 100 will be described.

The body portion 200 may be a structure that forms the overall frame of the smoking article case 100. Also, a space for storing one or more smoking articles (not illustrated) may be formed inside the body portion 200. Preferably, in order to protect the smoking articles from an external force, the body portion 200 may be made of a material that may form a sturdy structure. For example, the body portion 200 may be made of a rigid paper material. However, the material of the body portion 200 is not limited thereto.

Next, the cover 300 may be a structure that is connected to the body portion 200 to serve as a cover of the body portion 200 and may be formed as an openable/closable structure. A smoker may open the cover 300 to take out a smoking article stored in the body portion 200 or put a smoking article in the space inside the body portion 200. Also, the smoker may close the cover 300 to store a smoking article in the smoking article case 100. Preferably, the cover 300 may also be made of a material that may form a sturdy structure. For example, the cover 300 may also be made of a rigid paper material. However, the material of the cover 300 is not limited thereto.

As illustrated, a functional care zone 400 may be formed on at least a portion of an outer surface of the body portion 200 or the cover 300. The functional care zone 400 may be a region that provides a hand care function using a functional material. In a case in which the body portion 200 and/or the cover 300 is packaged by a packaging film, the functional care zone 400 may be formed on at least a portion of an outer surface of the packaging film. Examples of the packaging film include an oriented polypropylene (OPP) film on which discharge treatment is performed, but the scope of the present disclosure is not limited thereto. Hereinafter, for convenience of description, "functional care zone 400" will be referred to as "care zone 400."

In some embodiments, the care zone 400 may be formed in a concave region of the smoking article case 100. For example, when the cover 300 is manufactured to have a concave region formed on a specific surface thereof, the care zone 400 may be formed in the concave region. Here, the concave region may be a region that is recessed inward as compared to other regions. For example, a depth to which the concave region is recessed may be larger than or equal to the thickness of the care zone 400, but the depth is not limited thereto. In this case, a problem in which microcapsules are crushed regardless of the smoker's intention while the smoker carries the smoking article case 100 may be mitigated. For example, while the smoker carries the smoking article case 100 in a pocket, the care zone 400 may be damaged due to unintentional rubbing. According to the present embodiment, such a problem may be significantly mitigated.

For example, the care zone 400 may be formed by applying microcapsules that contain an ink and a functional material. Here, the ink may serve to visually convey information on characteristics of the care zone 400, such as the position of the care zone 400 and the type of care function thereof, to the smoker, and the microcapsules may provide a hand care function to the smoker. For example, as illustrated in FIG. 2, a functional material may be discharged as the microcapsules are crushed when a hand or a portion of the hand (e.g., a finger) of the smoker rubs against the care zone 400, and as the discharged functional material naturally comes into contact with the smoker's hand area, a hand care effect may be achieved. Therefore, a specific care function of the care zone 400 may be determined according to the type of functional material. Examples of the functional material include an antibacterial material, a deodorizing material, a perfuming material, a disinfecting material, and the like, but the functional material is not limited thereto.

Meanwhile, FIGS. 1 to 3 illustrate an example in which the care zone 400 is formed on a front surface or an upper surface of the cover 300, but the scope of the present disclosure is not limited thereto, and the care zone 400 may be designed to be disposed at various other positions. Also, the number, thickness, size, and/or shape of the care zone 400 may also be designed in various other ways.

Hereinafter, the care zone 400 will be described in more detail with reference to FIG. 4 and the subsequent drawings.

FIG. 4 is an exemplary view for describing the structure of the care zone 400 according to some embodiments of the present disclosure. In particular, FIG. 4 illustrates an example in which the care zone 400 is formed on an outer surface of the cover 300.

As illustrated in FIG. 4, the care zone 400 may include an ink layer 410 and a capsule layer 420. However, the care zone 400 conceptually refers to a region that provides the hand care function, and thus the ink layer 410 and the capsule layer 420 may be formed only in a partial region of the care zone 400, or only one of the ink layer 410 and the capsule layer 420 may be formed in a partial region of the care zone 400.

In some embodiments, a resin layer (not illustrated) may be disposed between the ink layer 410 and the capsule layer 420. The resin layer (not illustrated) may serve to protect the ink layer 410 and fix the capsule layer 420. The resin layer (not illustrated) may be formed by applying a resin. Since the resin has a property of being adhesive and a property of solidifying, microcapsules 430 may be easily attached, and scratches may be prevented during manufacture or distribution. Examples of the resin may include an adhesive vinyl-based polymer, a styrene monomer, α-methyl styrene, a 3D copolymer of acrylic acid, and the like, but the resin is not limited thereto.

Meanwhile, although the ink layer 410 and the capsule layer 420 forming the care zone 400 are illustrated as being clearly distinguished from each other in FIG. 4, this is only for providing convenience of understanding, and the ink layer 410 and the capsule layer 420 may either be clearly distinguished or not distinguished from each other according to an application method. For example, the care zone 400 may be formed by applying the microcapsules 430 on the ink layer 410 which is formed by applying an ink. Here, the ink and the microcapsules 430 may be applied using any method. For example, the ink layer 410 may be formed by printing an ink using an off-set printing method, but the method of applying the ink is not limited thereto. As another example, the care zone 400 may be formed by applying a functional composition, which contains the ink and the microcapsules 430, in one batch on the cover 300. For example, the functional composition may be applied on the body portion 200 and/or the cover 300 using the off-set printing method.

For reference, the off-set printing method is an indirect printing method that uses the repulsion between water and oil and may minimize crushing of the microcapsules 430 as compared to other printing methods such as gravure printing, and accordingly, spill of a functional material in processes of manufacturing and distributing the smoking article case 100 may be prevented.

In the previous example, the functional composition may be composed by mixing about 5 wt % to 40 wt % microcapsules 430 and about 60 wt % to 90 wt % ink, preferably, by mixing about 10 wt % to 35 wt % microcapsules 430 and about 65 wt % to 90 wt % ink or mixing about 10 wt % to 25 wt % microcapsules 430 and about 75 wt % to 90 wt % ink. Within these numerical ranges, color sharpness and the hand care effect of the care zone 400 may be simultaneously guaranteed.

Hereinafter, the ink layer 410 and the capsule layer 420 will be described in more detail.

The ink layer 410 may be formed by applying an ink. As mentioned above, the ink layer 410 may serve to visually convey information on characteristics of the care zone 400.

The shape of the ink layer 410 may be substantially the same as or different from the shape of the capsule layer 420.

The ink layer 410 may be designed to have various colors, shapes, etc. in consideration of the type of care function to be provided by the care zone 400, design elements, and the like. For example, in a case in which a plurality of care zones 400 which provide different care functions (e.g., an antibacterial function, a deodorizing function, a perfuming function, etc.) are formed, the ink layer 410 of each care zone 400 may be designed to have a color or shape different from that of the ink layer 410 of another care zone 400. As another example, the ink layer 410 may be designed to have a different color or shape according to the type of functional material related to the care zone 400. For example, in a case in which a functional material of the care zone 400 is a perfuming material that expresses an apple scent, the ink layer 410 may have a green color and be formed in the shape of an apple. Alternatively, in a case in which a functional material of the care zone 400 is a perfuming material that expresses a chocolate scent, the ink layer 410 may have a brown, reddish brown, or black color and be formed in a quadrangular shape. The ink layer 410 may also be formed in the shape of a symbol (e.g., a character, a sign, etc.).

Next, the capsule layer 420 may be formed by applying the microcapsules 430. The capsule layer 420 may provide the hand care function to the smoker by discharging a functional material contained therein as the microcapsules 430 are crushed. For example, the capsule layer 420 may have a transparent color, but the color of the capsule layer 420 is not limited thereto.

Each microcapsule 430 may include a functional material (or a functional composition including the same) and a film surrounding the same. The microcapsule 430 may be formed in a spherical shape whose diameter is less than or equal to about 10 μm, but the shape of the microcapsule 430 is not limited thereto. Also, the thickness of the film may be less than or equal to about 100 nm but is not limited thereto. Examples of a film material forming the film may include a melamine-based material, a cellulose-based material, and the like, but the film material is not limited thereto.

Examples of the functional material may include an antibacterial material, a deodorizing material, a perfuming material, a disinfecting material, and the like, but the functional material is not limited thereto. Also, examples of the antibacterial material may include grapefruit extract, lime oil, eucalyptus oil, pine needle oil, eucalyptol, limonene, and propolis, but the antibacterial material is not limited thereto.

In some embodiments, each microcapsule 430 may further contain a material that may change a color or color density of an ink, in addition to containing the functional material. For example, the microcapsule 430 may further contain a diluting material that may change the color density of an ink by diluting the ink. In this case, since the color or color density of the ink gradually changes as the microcapsules 430 are crushed, the amount of microcapsules 430 remaining in the care zone 400 area may be intuitively conveyed to the smoker through a visual change. That is, an effect of visually conveying the remaining period of use of the care zone 400 to the smoker may be achieved.

Meanwhile, the number, size, shape, color, arrangement form, and/or component aspects (e.g., the thickness and size of the capsule layer 420, the crushing strength and size of the microcapsules 430, etc.) of the care zone 400 may be designed in various ways and may vary according to embodiments. Hereinafter, various embodiments of the care zone 400 will be described with reference to FIG. 5 and the subsequent drawings.

FIG. 5 is a view for describing the care zone 400 according to a first embodiment of the present disclosure.

The smoking article case 100 is omitted in FIG. 5 and the subsequent drawings, but the care zone 400 may be understood as being formed on a surface of the smoking article case 100.

In the present embodiment, microcapsules 430 with different crushing strengths may be applied for each of a plurality of regions included in the care zone 400. Alternatively, in a case in which a plurality of care zones 400 are provided, microcapsules 430 with different crushing strengths may be applied for each care zone 400.

For example, as illustrated in FIG. 5, microcapsules 430 with a relatively lower crushing strength may be applied on a central region 402 of the care zone 400, and microcapsules 430 with a relatively high crushing strength may be applied on outer periphery regions 401 and 403 of the care zone 400. In this case, the hand care function of the care zone 400 may be improved, and a problem of possible damage to the care zone 400 may be mitigated, and the reasons are as follows. Considering that a smoker's rubbing motion is typically performed from an outer boundary toward the center, a weaker force is likely to act on the central region 402 as compared to a force that acts on the outer periphery regions 401 and 403. Therefore, when microcapsules 430 that may be crushed easily even with a weak force are applied on the central region 402, the microcapsules 430 may be evenly crushed throughout the entire region (e.g., the regions 401 to 403) of the care zone 400 and the amount of discharged functional material may increase, and accordingly, the hand care function of the care zone 400 may be effectively improved. Also, unintentional rubbing is likely to occur at the outer periphery regions 401 and 403 when the smoker carries the smoking article case 100. Therefore, when microcapsules 430 that are not easily crushed are applied on the outer periphery regions 401 and 403, a problem in which the microcapsules 430 are unintentionally crushed may be mitigated.

As another example, the crushing strength of the applied microcapsules 430 may gradually increase or decrease from a left side region (e.g., 401) toward a right side region (e.g., 403).

As still another example, microcapsules 430 with a first crushing strength may be applied on a first care zone formed on a specific surface of the smoking article case 100, and microcapsules 430 with a second crushing strength different from the first crushing strength may be applied on a second care zone formed on another surface of the smoking article case 100.

As yet another example, a care strength (or the amount of discharged functional material) of the care zone 400 or a specific region of the care zone 400 may be controlled through the crushing strengths of the microcapsules 430. Specifically, microcapsules 430 with a low crushing strength may be applied on a first region of the care zone 400, and microcapsules 430 with a high crushing strength may be applied on a second region of the care zone 400. In this case, in the first region, a large amount of functional material may be discharged due to the smoker's rubbing motion and thus a high-strength (or intense) care function may be provided, and in the second region, a small amount of functional material may be discharged due to the smoker's rubbing motion and thus a low-strength (or mild) care function may be provided. For reference, in this example, inks of different colors or color densities may be applied on the first region and the second region. Here, the color or color density of ink may be determined based on the care strength.

As yet another example, the amount of discharged functional material according to performance thereof may also be controlled through the crushing strengths of the microcapsules 430. Specifically, a high-performance (or intense) functional material (e.g., a material with high antibacterial performance, a material with high scent generation strength, etc.) may be held in microcapsules 430 with a high crushing strength and applied on a first region of the care zone 400, and a low-performance (or mild) functional material (e.g., a material with low antibacterial performance, a material with low scent generation strength, etc.) may be held in microcapsules 430 with a low crushing strength and applied on a second region of the care zone 400. In this case, due to the smoker's rubbing motion, a small amount of high-performance functional material may be discharged from the first region and a large amount of low-performance functional material may be discharged from the second region, and thus each region of the care zone 400 may have a uniform care strength. Of course, in order to impart differential care strengths for each region of the care zone 400 as in the previous example, the high-performance functional material may be held in the microcapsules 430 with a low crushing strength and applied on a specific region of the care zone 400.

In this way, the microcapsules 430 having various crushing strengths in consideration of the smoker's act of rubbing the care zone 400 (e.g., the rubbing strength, rubbing direction, rubbing motion, etc.), the characteristics (e.g., the care strength, etc.) of the care zone 400 may be applied in various forms.

For reference, the crushing strength of the microcapsules 430 may be controlled by a film material of the microcapsules 430. Examples of the film material may include a biodegradable polymer material (e.g., a cellulose-based material) and a melamine material, but the film material is not limited thereto. According to an experimental result, microcapsules using a cellulose-based material as the film material were confirmed as having a lower crushing strength and better biodegradability as compared to microcapsules using a melamine-based material as the film material.

The care zone 400 according to the first embodiment of the present disclosure has been described above with reference to FIG. 5. Hereinafter, a care zone 400 according to a second embodiment of the present disclosure will be described with reference to FIGS. 6 and 7.

FIGS. 6 and 7 are views for describing the care zone 400 according to the second embodiment of the present disclosure.

In the present embodiment, as illustrated in FIG. 6, a plurality of protruding regions (e.g., 411 and 412) may be formed apart from each other in the care zone 400. Alternatively, as illustrated in FIG. 7, a plurality of care zones 400-1 and 400-2 may be formed apart from each other while protruding past an outer surface of the smoking article case 100. The protruding regions (e.g., 411 and 412) may be regions that protrude outward from the smoking article case 100. The protruding regions (e.g., 411 and 412) may increase a frictional force with the smoker's hand area, thus preventing sliding of the smoker's hand and allowing the microcapsules 430 to be crushed easily during the rubbing motion. Accordingly, the hand care function of the care zone 400 may be effectively improved.

The protruding regions (e.g., 411 and 412) may be formed in various ways. For example, specific regions (e.g., 411 and 412) of the smoking article case 100 may be designed and manufactured to physically protrude to form the protruding regions (e.g., 411 and 412). As another example, a predetermined member may be attached to specific regions (e.g., 411 and 412) of the smoking article case 100 to form the protruding regions (e.g., 411 and 412). As still another example, a thick capsule layer 420 may be disposed on specific regions (e.g., 411 and 412) of the smoking article case 100 to form the protruding regions (e.g., 411 and 412). As yet another example, the protruding regions (e.g., 411 and 412) may be formed based on any combination of the above examples.

Meanwhile, detailed aspects (e.g., color, height, shape, separation distance, arrangement form, etc.) of the protruding regions (e.g., 411 and 412) may be designed in various ways as will be described below.

First, the degrees of protrusion (that is, heights) of the protruding regions (e.g., 411 and 412) may be the same as or different from each other. For example, the height may be designed to have various forms such as a gradually increasing form, a gradually decreasing form, and a form that repeats increasing and decreasing. In some examples, the heights of the protruding regions (e.g., 411 and 412) may be in a range of about 5 µm to 5,000 µm, preferably, about 10 µm to 1,000 µm or about 10 µm to 500 µm. However, the heights of the protruding regions (e.g., 411 and 412) are not limited thereto.

Also, the separation distance between the protruding regions (e.g., 411 and 412) or the size of the protruding regions (e.g., 411 and 412) may be uniform or different. For example, the separation distance (or the size) may be designed to have various forms such as a gradually increasing form, a gradually decreasing form, and a form that repeats increasing and decreasing.

Also, colors of the protruding regions (e.g., 411 and 412) may be the same as or different from a color of another region. For example, the ink layer 410 may be formed only on the protruding regions (e.g., 411 and 412). Here, the color or color density of the protruding regions (e.g., 411 and 412) may be different from that of a non-protruding region.

Also, the protruding regions (e.g., 411 and 412) may have various shapes and arrangement forms. For example, as illustrated in FIG. 6, the protruding regions (e.g., 411 and 412) may have a rectangular shape and be arranged in a vertical direction. In this case, frictional force may further increase when rubbing motion is performed in a horizontal direction (see FIG. 2). Since the smoker's rubbing motion is mostly performed in the horizontal direction, such arrangement of the protruding regions (e.g., 411 and 412) may effectively improve the hand care function. However, the arrangement form of the protruding regions (e.g., 411 and 412) is not limited thereto, and the protruding regions (e.g., 411 and 412) may also be arranged in the shape of a net.

Also, the microcapsules 430 may be applied throughout the entire care zone 400 or applied only on a portion thereof. For example, the microcapsules 430 may be applied only on the protruding regions (e.g., 411 and 412) or applied only between the protruding regions (e.g., 411 and 412). In a case in which the microcapsules 430 are applied between the protruding regions (e.g., 411 and 412), it is possible to alleviate a problem in which the microcapsules 430 are crushed due to unintentional rubbing while the smoker carries the smoking article case 100.

The care zone 400 according to the second embodiment of the present disclosure has been described above with reference to FIGS. 6 and 7. Hereinafter, a care zone 400 according to a third embodiment of the present disclosure will be described with reference to FIG. 8.

FIG. 8 is a view for describing the care zone 400 according to the third embodiment of the present disclosure.

In the present embodiment, as illustrated in FIG. 8, a protrusion pattern may be formed in the care zone 400.

Similar to the previous second embodiment, the protrusion pattern may increase a frictional force with the smoker's hand area and thus prevent sliding of the smoker's hand and allow the microcapsules 430 to be crushed easily during the rubbing motion. Accordingly, the hand care function of the care zone 400 may be effectively improved.

Detailed aspects (e.g., color, height, shape, density, etc.) of the protrusion pattern may be designed in various ways as will be described below.

In some examples, protrusion patterns may be formed with different densities in the care zone 400. For example, a protrusion pattern with a relatively low density may be formed in a first protrusion region of the care zone 400, and a protrusion pattern with a relatively high density may be formed in a second protrusion region of the care zone 400. In this case, since more microcapsules 430 will be crushed in the region where the protrusion pattern with a higher density is formed, the degree of discharge (expression) of a functional material may be controlled for each region. Here, more microcapsules 430 may be applied on the second protrusion region as compared to the first protrusion region, or the size of the second protrusion region may be larger than the size of the first protrusion region. Alternatively, microcapsules 430 containing a high-performance functional material may be applied on the second protrusion region, or the opposite case is also possible. Alternatively, an ink which has a darker color or higher color density as compared to an ink applied on the first protrusion region may be applied on the second protrusion region.

As a more specific example, as illustrated in FIG. 8, a protrusion pattern may be formed with a relatively high density in a central protrusion region 422, and a protrusion pattern may be formed with a relatively low density in outer periphery protrusion regions 421 and 423. In this case, similar to the above description, a functional material may be evenly discharged from the entire region (e.g., the regions 421 to 423), and thus the hand care function of the care zone 400 may be improved. For reference, more microcapsules 430 may be applied on the central protrusion region 422 as compared to the outer periphery protrusion regions 421 and 423, and in this case, since the microcapsules 430 are intensively crushed in the central protrusion region 422, the care strength (that is, the amount of discharged functional material) of the central protrusion region 422 may be improved.

The care zone 400 according to the third embodiment of the present disclosure has been described above with reference to FIG. 8. Hereinafter, a care zone 400 according to a fourth embodiment of the present disclosure will be described with reference to FIG. 9.

FIG. 9 is a view for describing the care zone 400 according to the fourth embodiment of the present disclosure.

In the present embodiment, as illustrated in FIG. 9, an ink may be applied to configure a designated symbol 430 in the care zone 400. Alternatively, one or more care zones 400 on which an ink is applied may be formed (arranged) to configure a designated symbol (e.g., a functional composition may be printed in the form of a symbol). Here, the symbol may be anything that may be expressed, such as a character, a number, a sign, a logo, a mark, a code, an image, or an emoji.

In some examples, information on the care zone 400 may be coded in the designated symbol 430. For example, information on the care zone 400 may be coded in the form of the symbol 430 according to a predetermined rule, like a barcode (see FIG. 9) or a QR code. In this case, the information on the care zone 400 may be provided to the smoker through the symbol 430. For example, the smoker may scan (or recognize) the symbol 430 on the smoking article case 100 through a scanning device (e.g., a smartphone or the like in which a symbol recognition application is installed) to receive the information on the care zone 400. For example, the information on the care zone 400 may include the type of functional material, a hand care manual (e.g., a preferred rubbing motion, a number of times rubbing occurs, a direction of rubbing, etc.), a link (e.g., URL) for such information, etc., but is not limited thereto.

The care zone 400 according to the fourth embodiment of the present disclosure has been described above with reference to FIG. 9. Hereinafter, care zones 441 to 443 according to a fifth embodiment of the present disclosure will be described with reference to FIGS. 10 to 12.

FIGS. 10 to 12 are exemplary views for describing the care zones 441 to 443 according to the fifth embodiment of the present disclosure. In FIGS. 10 to 12, arrows indicate exemplary rubbing directions.

In the present embodiment, as illustrated in FIG. 10, a plurality of care zones 441 to 443 configured to provide different care functions may be formed on an outer surface of the smoking article case 100. That is, the plurality of care zones 441 to 443 may be formed by microcapsules 430 containing different functional materials being applied on different positions of the smoking article case 100. In this case, it is possible to provide multifaceted and comprehensive hand care functions (e.g., F1+F2+F3) to the smoker.

Detailed aspects (e.g., number, type, shape, size, color, etc.) of each of the care zones 441, 442, and 443 may be designed in various ways as will be described below.

In some examples, inks of different colors (or color densities) may be applied on each of the care zones 441 to 443. In this case, each of the care zones 441 to 443 may be visually distinguished, and the smoker may selectively utilize each of the care zones 441 to 443.

Also, in some examples, a first care zone 441 may be an antibacterial zone formed by applying microcapsules 430 containing an antibacterial material, a second care zone 442 may be a deodorizing zone formed by applying microcapsules 430 containing a deodorizing material, and a third care zone 443 may be a perfuming zone formed by applying microcapsules 430 containing a perfuming material. In this case, it is possible to provide a comprehensive hand care function that includes an antibacterial function, a deodorizing function, and a perfuming function.

Also, in some examples, as illustrated in FIG. 11, specific care zones 441 and 442 may be alternately formed. Alternatively, a specific care zone 441 or 442 may be each formed as a plurality of care zones 441 or 442. In this case, a specific care function (e.g., an antibacterial function, a deodorizing function, or a perfuming function) may be further enhanced and provided to the smoker.

Also, in some examples, a preferred rubbing direction (or care order) may be visually guided through shapes or colors (or color densities) of the care zones (e.g., 441, 442, and 443). The shapes or colors of the care zones (e.g., 441, 442, and 443) may be determined by the ink layer 410, but the present disclosure is not limited thereto. As a specific example, as illustrated in FIG. 12, the care zones (e.g., 441, 442, and 443) may be formed so that the overall shape thereof indicates the right side. In this case, visual guidance to the right side as a preferred rubbing direction may be provided for the smoker. As another example, the color densities of the sequentially disposed care zones (e.g., 441, 442, and 443) may gradually increase or decrease in a specific direction. Even in this case, visual guidance in the specific direction as a preferred rubbing direction may be indirectly provided for the smoker. Such examples may be effective when there is a preferred care order between the care zones (e.g., 441, 442, and 443). For example, when the first care zone (e.g., 441) is a deodorizing zone and the second care zone (e.g., 442) is a perfuming zone, it may be preferable to provide the care function of the first care zone (e.g., 441) prior to the care function of the second care zone (e.g., 442). In this case, the above examples may be effectively applied.

The care zones 441 to 443 according to the fifth embodiment of the present disclosure have been described above with reference to FIGS. 10 to 12.

Although the first to fifth embodiments of the present disclosure have been separately described above, the first to fifth embodiments may be combined in various forms. For example, in order to maximize performance (that is, the amount of discharged functional material) of a specific region of the care zone 400, a protrusion pattern with a high density may be formed and microcapsules 430 with a low crushing strength may be applied on the specific region. As another example, in order to maximize performance of a specific care zone (e.g., 442) among the plurality of care zones (e.g., 441 to 443) having different care functions, a protrusion pattern with a high density may be formed and microcapsules 430 with a low crushing strength may be applied on the specific care zone (e.g., 442).

Hereinafter, the above-described configurations and effects of the smoking article case 100 will be described in more detail using experimental examples and examples of embodiments. However, the scope of the present disclosure is not limited by the examples below.

Experimental Example 1: Selection of Antibacterial Materials

In order to select antibacterial materials to be applied to the examples below, an experiment for measuring antibacterial performance was conducted for grapefruit extract, propolis, eucalyptus oil, pine needle oil, lime oil, eucalyptol, and limonene. Specifically, a total of four types of bacteria (*Escherichia coli*, *Pseudomonas aeruginosa*, *Bacillus subtilis*, and *Staphylococcus aureus*) were cultured using a layered medium, and the size (mm) of an inhibition zone formed when loading the antibacterial material was measured. Here, the loading amount (μl) of the antibacterial material was set to 10, 25, and 50, and the experimental results are shown in Tables 1 to 3 below. Table 1 shows an experimental result when the loading amount (μl) of the antibacterial material was 10, and Tables 2 and 3 show experimental results when the loading amount (μl) of the antibacterial material was 25 and 50, respectively.

TABLE 1

| | Gram negative | | Gram positive | |
|---|---|---|---|---|
| Classification | Escherichia coli | Pseudomonas aeruginosa | Bacillus subtilis | Staphylococcus aureus |
| Grapefruit extract | 13 | 16 | 16 | 21 |
| Propolis | — | — | 11 | 14 |
| Eucalyptus oil | 9 | — | 12 | 10 |
| Pine needle oil | — | 10 | 18 | 10 |

TABLE 1-continued

| | Gram negative | | Gram positive | |
|---|---|---|---|---|
| Classification | Escherichia coli | Pseudomonas aeruginosa | Bacillus subtilis | Staphylococcus aureus |
| Lime oil | 10 | 18 | 13 | 12 |
| Eucalyptol | 9 | 10 | 10 | 9 |
| Limonene | 9 | 9 | 12 | 10 |

TABLE 2

| | Gram negative | | Gram positive | |
|---|---|---|---|---|
| Classification | Escherichia coli | Pseudomonas aeruginosa | Bacillus subtilis | Staphylococcus aureus |
| Grapefruit extract | 15 | 19 | 20 | 23 |
| Propolis | — | 11 | 12 | 16 |
| Eucalyptus oil | 13 | 12 | 22 | 15 |
| Pine needle oil | 10 | 13 | 18 | 13 |
| Lime oil | 15 | 22 | 23 | 20 |
| Eucalyptol | 12 | 12 | 14 | 11 |
| Limonene | 16 | 14 | 20 | 18 |

TABLE 3

| | Gram negative | | Gram positive | |
|---|---|---|---|---|
| Classification | Escherichia coli | Pseudomonas aeruginosa | Bacillus subtilis | Staphylococcus aureus |
| Grapefruit extract | 20 | 22 | 32 | 24 |
| Propolis | — | 13 | 14 | 17 |
| Eucalyptus oil | 17 | 14 | 28 | 20 |
| Pine needle oil | 11 | 18 | 26 | 17 |
| Lime oil | 28 | 38 | 30 | 30 |
| Eucalyptol | 16 | 16 | 24 | 13 |
| Limonene | 17 | 24 | 22 | 20 |

Referring to Tables 1 to 3, most of the antibacterial materials exhibited concentration-dependent antibacterial activity, and the antibacterial performance of grapefruit extract and lime oil was found to be generally excellent. However, eucalyptus oil, pine needle oil, eucalyptol, and limonene were also found to have antibacterial performance of a certain level or more. Limonene was found to have inferior antibacterial performance as compared to lime oil despite being a major component of lime oil. This is determined to be due to lime oil's components other than limonene also having antibacterial activity.

Example 1

Microcapsules were produced using grapefruit extract as an antibacterial material, and a functional composition containing the microcapsules and an ink was applied on an upper surface of a cover using an off-set printing method to produce a smoking article case illustrated in FIGS. 1 to 3. Three types of functional compositions were prepared by varying the content of the microcapsules to 10 wt % (90 wt % ink), 15 wt % (85 wt % ink), and 20 wt % (80 wt % ink).

Example 2

A smoking article case was produced in the same manner as in Example 1 except that eucalyptus oil was used as an antibacterial material.

Example 3

A smoking article case was produced in the same manner as in Example 1 except that pine needle oil was used as an antibacterial material.

Example 4

A smoking article case was produced in the same manner as in Example 1 except that lime oil was used as an antibacterial material.

Experimental Example 2: Measurement of Antibacterial Performance According to Rubbing Motion An experiment for measuring the antibacterial performance according to rubbing motion was conducted for the smoking article cases according to Examples 1 to 4. Specifically, a sample consisting of *Staphylococcus aureus* (initial microbial content: about $1.7 \times 10^3$ CFU) was rubbed against a perfuming zone of each smoking article case (number of rubs: 5, 10), and the residual microbial content (CFU) of the sample was measured. An average value of a total of five measurement results was calculated as the residual microbial content (CFU), and the experimental results are shown in Tables 4 to 6 below. Table 4 shows an experimental result when the content of the microcapsules of the functional composition was 10 wt %, and Tables 5 and 6 show experimental results when the content of the microcapsules of the functional composition was 15 wt % and 20 wt %, respectively.

TABLE 4

| Classification | Example 1 (Grapefruit extract) | | Example 2 (Eucalyptus oil) | | Example 3 (Pine needle oil) | | Example 4 (Lime oil) | |
| --- | --- | --- | --- | --- | --- | --- | --- | --- |
| | 5 | 10 | 5 | 10 | 5 | 10 | 5 | 10 |
| Residual microbial content (CFU) | $4.8 \times 10^2$ | $4.4 \times 10^2$ | $5.2 \times 10^2$ | $5.0 \times 10^2$ | $6.3 \times 10^2$ | $6.2 \times 10^2$ | $4.3 \times 10^2$ | $4.4 \times 10^2$ |
| Bacterial reduction rate (%) | 71.8 | 74.1 | 69.4 | 70.6 | 62.9 | 63.5 | 74.7 | 74.1 |

TABLE 5

| Classification | Example 1 (Grapefruit extract) | | Example 2 (Eucalyptus oil) | | Example 3 (Pine needle oil) | | Example 4 (Lime oil) | |
| --- | --- | --- | --- | --- | --- | --- | --- | --- |
| | 5 | 10 | 5 | 10 | 5 | 10 | 5 | 10 |
| Residual microbial content (CFU) | $4.5 \times 10^2$ | $4.3 \times 10^2$ | $4.8 \times 10^2$ | $4.7 \times 10^2$ | $5.5 \times 10^2$ | $5.2 \times 10^2$ | $4.2 \times 10^2$ | $4.1 \times 10^2$ |
| Bacterial reduction rate (%) | 73.5 | 74.7 | 71.8 | 72.4 | 67.6 | 69.4 | 75.3 | 75.9 |

TABLE 6

| Classification | Example 1 (Grapefruit extract) | | Example 2 (Eucalyptus oil) | | Example 3 (Pine needle oil) | | Example 4 (Lime oil) | |
| --- | --- | --- | --- | --- | --- | --- | --- | --- |
| | 5 | 10 | 5 | 10 | 5 | 10 | 5 | 10 |
| Residual microbial content (CFU) | $4.1 \times 10^2$ | $3.7 \times 10^2$ | $4.2 \times 10^2$ | $3.9 \times 10^2$ | $5.3 \times 10^2$ | $5.0 \times 10^2$ | $4.1 \times 10^2$ | $3.9 \times 10^2$ |
| Bacterial reduction rate (%) | 75.9 | 78.2 | 75.3 | 77.1 | 68.8 | 70.6 | 75.9 | 77.1 |

Referring to Tables 4 to 6, it can be confirmed that a sufficient antibacterial effect is achieved when rubbing motion is performed against the smoking article cases (that is, care zones) according to the examples. In this way, it can be seen that the smoking article cases according to the examples may provide a hand care function, and it can be seen that other types of hand care functions may also be sufficiently provided when a functional material contained in the microcapsules is changed.

Specifically, the antibacterial performance of the smoking article cases (that is, care zones) according to the examples was found to be generally dependent on the content of the microcapsules. That is, the bacterial reduction rate according to rubbing motion was found to generally increase with an increase in the content of the microcapsules in the functional composition. On the other hand, the bacterial reduction rate was not found to be very dependent on the number of rubbing motions.

Also, similar to the experimental results shown in Tables 1 to 3, the antibacterial performance of the smoking article cases on which the microcapsules containing grapefruit extract and lime oil were applied (Example 1 and Example 4) was found to be generally excellent. Specifically, a bacterial reduction rate of about 70% or more was confirmed as being guaranteed when using the smoking article cases according to Examples 1 and 4 even when the content of the microcapsules was about 10 wt %. On the other hand, it was found that the content of the microcapsules needs to be about 20 wt % or more in order to guarantee the bacterial reduction rate of about 70% or more when using the smoking article case on which the microcapsules containing pine needle oil were applied (Example 3), and it was found that the content of the microcapsules needs be about 15 wt % or more when using the smoking article case on which the microcapsules containing eucalyptus oil were applied (Example 2).

The configurations and effects of the smoking article case 100 have been described in more detail above using the examples and experimental examples.

The embodiments of the present disclosure have been described above with reference to the accompanying drawings, but those of ordinary skill in the art to which the present disclosure pertains should understand that the present disclosure may be embodied in other specific forms without changing the technical spirit or essential features thereof. Therefore, the embodiments described above should be understood as being illustrative, instead of limiting, in all aspects. The scope of the present disclosure should be interpreted based on the claims below, and any technical spirit within the scope equivalent to the claims should be interpreted as falling within the scope of the technical spirit defined by the present disclosure.

What is claimed is:

1. A smoking article case comprising:
a body portion in which an inner space for storing a smoking article is formed; and
a cover which is connected to the body portion,
wherein a functional care zone is formed on at least a portion of an outer surface of the body portion and an outer surface of the cover,
microcapsules containing a functional material are applied on at least a portion of the functional care zone, and
the functional material includes an antibacterial material, wherein
the microcapsules includes first microcapsules and second microcapsules;
the first microcapsules having a first crushing strength are applied on a central region of the functional care zone;
the second microcapsules having a second crushing strength are applied on an outer periphery region of the functional care zone; and
the first crushing strength is lower than the second crushing strength.

2. The smoking article case of claim 1, wherein the antibacterial material includes one or more materials from among grapefruit extract, lime oil, eucalyptus oil, pine needle oil, eucalyptol, limonene, and propolis.

3. The smoking article case of claim 1, wherein:
an ink is applied on the at least a portion of the functional care zone; and
the microcapsules applied on the functional care zone further contain a material that changes a color or a color density of the ink.

4. The smoking article case of claim 1, wherein the functional care zone includes a plurality of protruding regions disposed apart from each other.

5. The smoking article case of claim 4, wherein a degree of protrusion or a separation distance of at least some of the plurality of protruding regions is different from a degree of protrusion or a separation distance of other protruding regions of the plurality of protruding regions.

6. The smoking article case of claim 1, wherein:
an ink is applied to indicate a designated symbol in the functional care zone; and
information on the functional care zone is coded in the designated symbol.

7. The smoking article case of claim 1, wherein:
the functional care zone includes a first functional care zone on which microcapsules containing a first functional material are applied and a second functional care zone on which microcapsules containing a second functional material different from the first functional material are applied; and
inks of different colors are applied on the first functional care zone and the second functional care zone, respectively.

8. The smoking article case of claim 1, wherein the functional care zone further includes a deodorizing zone and a perfuming zone in addition to an antibacterial zone on which the microcapsules containing the antibacterial material are applied.

9. A smoking article case comprising:
a body portion in which an inner space for storing a smoking article is formed; and
a cover which is connected to the body portion,
wherein a functional care zone is formed on at least a portion of an outer surface of the body portion and an outer surface of the cover,
microcapsules containing a functional material are applied on at least a portion of the functional care zone, and
the functional material includes an antibacterial material, wherein:
the microcapsules includes first microcapsules and second microcapsules;
the first microcapsules having a first crushing strength are applied on a first region of the functional care zone;
the second microcapsules having a second crushing strength are applied on a second region of the functional care zone;
the first crushing strength is lower than the second crushing strength;

a film material of the first microcapsules includes a cellulose-based material; and a film material of the second microcapsules includes a melamine-based material.

10. A smoking article case comprising:

a body portion in which an inner space for storing a smoking article is formed; and a cover which is connected to the body portion, wherein a functional care zone is formed on at least a portion of an outer surface of the body portion and an outer surface of the cover, microcapsules containing a functional material are applied on at least a portion of the functional care zone, and the functional material includes an antibacterial material, wherein:

the functional care zone includes a protrusion region in which a protrusion pattern is formed;

the protrusion region includes a first protrusion region and a second protrusion region;

a protrusion pattern with a first density is formed in the first protrusion region, a protrusion pattern with a second density higher than the first density is formed in the second protrusion region; and an ink with a color density higher than a color density of an ink applied on the first protrusion region is applied on the second protrusion region.

* * * * *